July 25, 1950
E. C. HARRIS
2,516,569
GEOGRAPHICAL POSITION LOCATOR FOR
MAPS, PLATS, AND CHARTS
Filed June 15, 1945
2 Sheets-Sheet 1
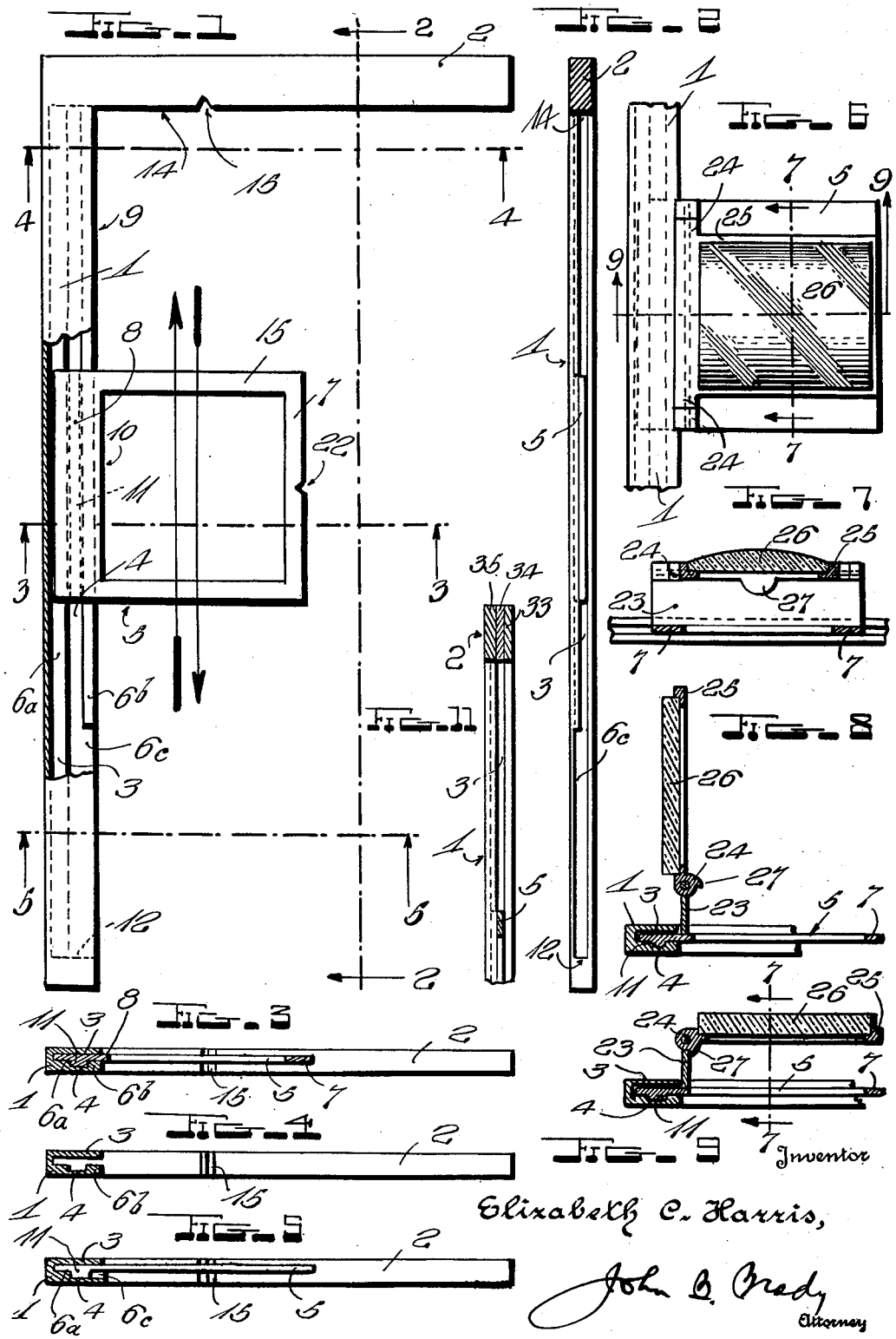
Inventor
Elizabeth C. Harris,
John B. Brady
Attorney

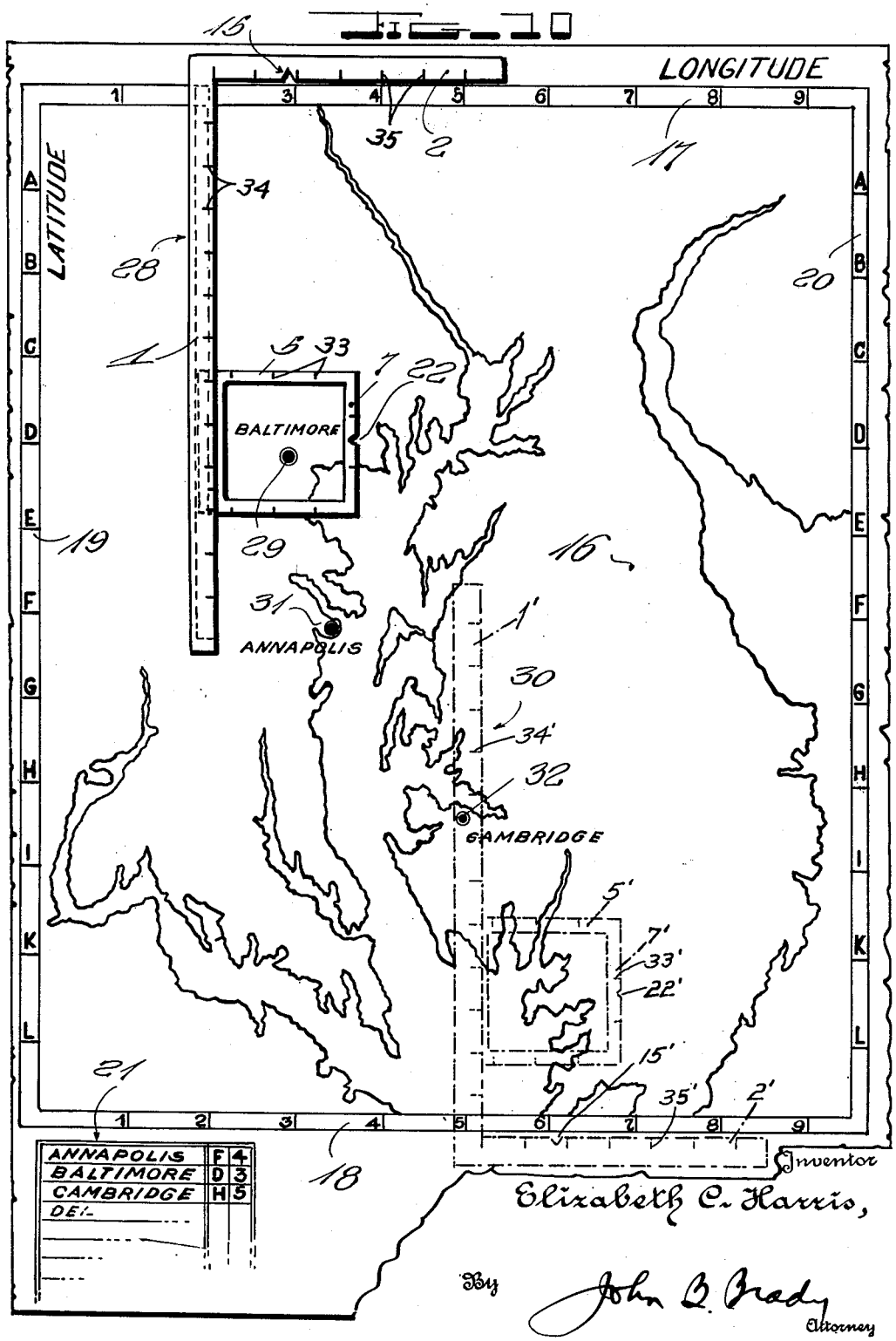

Patented July 25, 1950

2,516,569

UNITED STATES PATENT OFFICE 2,516,569

GEOGRAPHICAL POSITION LOCATOR FOR MAPS, PLATS, AND CHARTS

Elizabeth C. Harris, Somerset, Md.

Application June 15, 1945, Serial No. 599,569

1 Claim. (Cl. 35—40)

My invention relates broadly to maps and more particularly to a device for facilitating the location of geographical positions on maps, plats, charts, etc.

One of the objects of my invention is to provide a construction of position locating device for maps, plats, charts, etc., which may be manufactured on a mass scale inexpensively.

Another object of my invention is to provide a construction of geographical position locater for maps, plats, charts and the like which can be produced in flat form and superimposed upon the marginal edge of a map, plate or chart in coordination with the latitude and longitude indicia carried by the margins thereof with slidable means coordinated with such indicia for speedily locating geographical positions on the map, plat or chart.

Still another object of my invention is to provide a construction of position locater for maps, plats, charts, etc. which consists of a flat sheetlike device having right-angularly disposed portions adapted to be aligned with latitude and longitude sections of the map, plat or chart with slidable means carried by one of the right-angularly disposed portions and adapted to be positionally adjusted with respect to marginal indicia on the map, plat or chart for facilitating the speedy location of geographical positions on the map, plat or chart.

Still another object of my invention is to provide a form of position locating device which may be readily molded from plastic material for distribution to map users, including straight edge portions alignable with latitude and longitude sections of the map and an adjustable portion slidable to selected positions with respect to said straight edge portions in coordination with marginal indicia on the map for facilitating the location of geographical positions on the map.

Still another object of my invention is to provide a construction of position locating device for maps including a straight edge structure and an adjustable slide associated therewith with magnification means carried by the adjustable slide for facilitating the observation of a geographical position on the map when located by adjustment of the slide.

Other and further objects of my invention reside in the construction of a geographical position locater for standard maps which is capable of such inexpensive production that it may readily be distributed as an advertising novelty for association with automobile road maps as set forth more fully in the specification hereinafter following by reference to the accompanying drawings in which:

Figure 1 is a plan view of the map position locater structure in accordance with my invention, a portion of the view being broken away and illustrated in section to show the adjustable arrangement of the position locating slide with respect to the map position locater structure; Fig. 2 is a vertical sectional view taken on line 2—2 of Fig. 1; Fig. 3 is a transverse sectional view taken on line 3—3 of Fig. 1 showing the adjustable slide constituting the position locating slide used in the device of my invention; Fig. 4 is a transverse sectional view taken on line 4—4 of Fig. 1; Fig. 5 is a transverse sectional view taken on line 5—5 of Fig. 1; Fig. 6 is an elevational view showing the application of a magnifying device to the adjustable slide for setting the position locating slide; Fig. 7 is a sectional view taken through the adjustable slide and the magnifying means associated therewith on line 7—7 of Figs. 6 and 9; Fig. 8 is a transverse sectional view taken through the adjustable slide and the magnifying means associated therewith where the magnifying means is elevated out of optical relation to the slide; Fig. 9 is a transverse sectional view through the adjustable slide and the magnifying means associated therewith taken substantially on line 9—9 of Fig. 6; Fig. 10 is a view of a representative map showing the marginal latitude and longitude indicia carried thereby and the application of the map position locating device of my invention applied thereto for facilitating the location of a particular geographical position such as a city, town or other geographical location; and Fig. 11 is a fragmentary sectional view showing the device of my invention constructed from laminated sheet-like material as distinguished from the molding thereof from plastic.

My invention is directed to the production of an inexpensive form of map position locating device which may be used for a variety of purposes in association with plats, charts or maps, such as the location of lots and squares in real estate operations; the quick determining of strategic positions in military operations; the location of the position of cities in zones for determining parcel post rates; the location of geographical positions in connection with surveys of many kinds such as soil conservation, radio broadcast station service areas and forestry research and coast and geodetic surveys and agricultural surveys; as well as the wide use of the device by tourists in the quick analysis of road maps for locating traveling objectives; and for use by students in educational training; and as a game for entertainment purposes and map studies by reason of the flat characteristics of the device which readily lends itself to be easily carried between the pages of a book.

The device of my invention may be readily stamped from sheet material or molded from plastic material or otherwise formed from strip-like members which may be right-angularly disposed with respect to each other for providing a pair of straight edge portions. One straight edge portion is provided with suitable indicia which may be registered with marginal indica on a map under study while the other straight edge portion provides a track or slide-way for the adjustment of a movable slide having an observing frame thereon which may be moved to a position surrounding the particular geographical area under observation. The adjustable frame carries indicia registrable with the opposite marginal indicia of the map whereby having been given a particular geographical position in terms of latitude and longitude indicia on the map, one straight edge portion of the device may have the indicia thereof registered with the latitude indicia of the position to be located while the adjustable device is moved to a position in alignment with the given longitude indicia, or vice versa, whereby the position to be located will be found within the confined area surrounded by the frame of the adjustable slide. The addition of the magnification means further facilitates the location of particular geographical positions.

Referring to the drawings in detail reference character 1 designates one straight edge portion of the map position locating device while reference character 2 designates the other straight edge portion of the map position locating device. The straight edge portion 2 is right angularly or normally disposed with respect to the straight edge portion 1. The straight edge portions may be molded or stamped from sheet-like material. Where sheet-like material is used as in Fig. 11, laminated strips are provided for building up the straight edge portions, so that a track-way, slide-way or groove 3 enclosed by straight edge 1 and internally disposed groove or recess 4 extending longitudinally of the straight edge 1 permit the insertion and removal of the adjustable slide 5 through the cut-away portion 6c of the outer flange portion 6b of the internal structure of straight edge 1. The groove 4 is defined at one side by the longitudinal flange 6b and at the other side by the longitudinal flange 6a in the internal structure of straight edge 1 between which the tongue 11 of the adjustable slide 5 extends.

The adjustable slide 5 comprises a polygonally shaped frame 7, having relatively narrow marginal frame-like portions terminating in an extended marginal portion 8 at the lefthand edge thereof. The marginal portion 8 of the frame 5 has a width sufficient to extend into the track-way, slide-way or groove 3 of straight edge 1, and yet permit projection thereof beyond the righthand longitudinal edge 9 of straight edge 1, so that the interior edge 10 of the adjustable slide 5 appreciably projects beyond the straight edge 1 for defining an area which when superimposed upon a portion of the map under observation allows a selected restricted area of the map to be located, observed and studied.

The adjustable slide 5 is also stamped from sheet-like material or molded from plastic and includes a longitudinally disposed tongue or projection 11, which is adapted to extend into the aligned groove 4 of the straight edge 1. The offset distance of the tongue 11 from the plane of the adjustable slide 5 is so restricted that adjustable slide 5 may be readily inserted in the slotted portion 6 adjacent the end of straight edge 1, as shown more particularly in the cross-sectional view, Fig. 5, preparatory to the longitudinal movement of the adjustable slide 5 when the tongue 11 is engaged in the longitudinal groove 4, illustrated more particularly in Fig. 3. The longitudinal movement of the adjustable slide 5 is limited at one end by abutment with the internal stop 12, formed in straight edge 1, and at the other end by abutment with the inner straight edge 14 of the straight edge portion 2. As hereinafter stated straight edge portions 1 and 2 are formed either from molded plastic material as in Figs. 1-9 or from strip-like laminations as in Fig. 11. When formed from strip-like laminations the section of each straight edge portion is built up by strips 33, 34 and 35 extending face to face with respect of each other and united by suitable cement or glue. The strip 35 is shown as having the groove and other corresponding parts 4 disposed longitudinally of the internal portion of straight edge 1 as explained in connection with the molded form of my invention. When molded from plastic the central portion of the straight edge 2 is formed to provide a thickness equivalent to the thickness of the straight edge portion 1, which provides the spaced slide-way or track-way 3, within which the adjustable slide 5 operates.

The straight edge portion 2 has an indicia or indicating mark 15 carried adjacent the internal edge 14. The indicia or marker 15 may be a V-shaped notch which is readily registrable with the longitude indicia carried by the upper or lower marginal edges of the map under study such as the map 16 that I have illustrated as a representative example in Fig. 10. It will be observed that in the representative map of Fig. 10 the longitude indicia are located at the upper and lower marginal edges of the map as represented at 17 and 18 whereas the latitude indicia for the map are represented at the left and right-hand margins of the map designated at 19 and 20. As is conventional, the longitude indicia are indicated by numbers 1, 2, 3, 4, etc., whereas the latitude indicia are represented by letters A, B, C, D, etc. A chart 21 is provided giving the names of cities, towns or geographical locations in terms of the latitude and longitude designations as is conventional.

The straight edge portion 1 which serves as a guide for the adjustable frame 5 may be aligned with any longitudinal section of the map 16 which allows the indicia or the notch 15 adjacent the interior edge 14 of straight edge 2 to be aligned with the longitude indicia 17 of the map 16 in facilitating the finding of any geographical location on the map. The slide 5 has the frame 7 thereof suitably marked or notched or otherwise provided with indicia at 22 in the external peripheral edge thereof for alignment with selected latitude indicia 20 on map 16. In lieu of or in addition to the indicia, marking or notches 15 and 22, I may provide suitable graduations 33 on the slide 5 or on the straight edges 1 and 2, as represented at 34 and 35. Such graduations may be divided into degrees for more accurately registering with comparable markings on the marginal edges of the map. The graduations may serve as distance determining means according to the scale of the map.

The straight edge portions 1 and 2 and the adjustable slide 5 all constitute a structure relatively small in thickness, scarcely more than one-sixteenth inch as a maximum so that the device in its principal form lends itself to be readily carried between the leaves of a book. The dimension is so unappreciable that the device may be readily carried in a school-bag as an adjunct to students' auxiliaries for facilitating map studies. For example, the straight edge 1 may be approximately 12 inches long and the normally disposed straight edge 2 approximately 6 inches long for application to conventional automobile road maps. The polygonally shaped slide 5 provides an open space approximately two and one-half inches square in internal dimensions of the frame 7.

Where a magnifying glass attachment is employed as shown in Figs. 8 and 9 separate provision is made for carrying such attachment parts.

All standard maps have designations, numbers top and bottom, letters on sides, to which the index of towns and cities on the map are keyed. Thus a given place on the may may fall within "8–C." By placing the straight edge 2 on the top 17 or bottom margin 18 of the map 16 and moving the slide 5 on the straight edge 1 to center on "C" and then moving the instrument so that the notch 15 on the straight edge 2 is on "8," the place being looked for will appear within the open square of frame 7. Thus by limiting the section of the map to be searched, the described place may be readily and speedily located. Because it may be necessary to mark the map the square of frame 7 is left open. In the event, however, that marking of the map is not desired, the magnifying glass 26 is attached. The magnifying glass operates on a hinge and can be moved over the open space in frame 7.

The instrument and square of frame 7 can be made to any size but for standard commercial maps a 12" by 6" instrument with a 2½" square opening has been found most practical.

In order to more conveniently observe locations on the map I may provide the slide 5 with an upwardly extending projection 23. The vertical extension 23 serves as a support for a hinged connection 24 extending from a frame 25. The frame 25 provides a marginal mounting means for a magnifying glass 26. The magnifying glass may be moved to a position in which it is normally out of use as represented in Fig. 8 or to a position in which the magnifying glass is operative as represented in Fig. 9 spaced from the surface of map 16 for a sufficient distance to allow magnification of the section of the map under observation. The movement of the magnifying glass 26 is restricted by an extension or lip 27 on the frame 25 and the abutment thereof with the interior face of the upstanding support 23 as represented in Fig. 9. It will be understood that the application of the magnifying glass to the structure of my invention is not essential, as the locator as illustrated in Figs. 1–5 may carry out all of its functions without the addition of the magnifying glass although the convenience and efficiency of the structure is improved by including the magnifying glass.

In using the map locating device of my invention it is possible to apply the device to a map in a variety of ways as represented, for example, in Fig. 10 in which the device is shown in use in two alternate positions. In one position illustrated at 28 the straight edge portion 2 has the indicia 15 thereof aligned with the longitude indicia 17 at the upper marginal edge of the map 16 while slide 5 has the indicia 22 thereof aligned with the latitude indicia 20 at the left marginal edge of the map 16. In the particular example illustrated the problem is to readily locate the city of Baltimore which is in the chart 21 printed upon the lower portion of the map 16 is represented as located at latitude D and longitude 3. It will be seen that indicia 15 on straight edge 2 has been located in alignment with indicia 3 of the marginal edge 17 of map 16 immediately below which the designation for the city of Baltimore at 29 is found on the map 16. It will be seen that slide 5 has been longitudinally shifted in straight edge 1 so that indicia 22 on frame 7 of slide 5 is aligned with latitude designation D of marginal edge 20 of the map 16. Accordingly within the observing frame 7 of slide 5 the objective which in this instance is the city of Baltimore is readily located. In quickly finding cities located in close proximity on maps where hundreds of such cities may be displayed it will be realized that the map locating device of my invention serves an extremely useful purpose. Where convenience in application of the device of my invention to maps is facilitated the device is applied in an alternate manner as represented at 30 where the straight edge 2' having graduations 35' thereon has the indicia 15 therein aligned with indicia designating the longitude margin of the map 16 at 18 whereas the straight edge 1' having graduation 34' thereon is aligned with latitude portion of the map 16 for permitting the adjustment of the slide 5' with graduation 33' thereon vertically of the map 16 for aligning notch 22' in frame 7' of slide 5 with the latitude designation in the margin 20 of the map 16. The other examples shown on the map for the location of cities or towns in a congested area of the map are as set forth on chart 21, that is, Annapolis designated at 31 and illustrated in the chart as locatable according to latitude F and longitude 4 and Cambridge designated at 32 and locatable according to latitude H and longitude 5. It will be understood that in instances where straight edge 1 or straight edge 2 may not be of sufficient length to readily align with the top marginal edge of the map, the device of my invention readily lends itself for application in a position more centrally of the map with the indicia 15 and 22 aligned at appreciable distances with the indicia on the marginal edges of the map for facilitating the use of the device as a map locator. Moreover, the device may be used in reverse position by merely turning the device over and registering straight edge portion 2 with the indicia 18 along the lower marginal edge of the map 16. The use of the flat strip-like device of my invention in its reverse position is possible only because of the symmetry of the markings at 15 and 22 which are uniform on both sides of the device. The reverse position of the device is useful when applying the device to maps of large size where the device may only cover a portion of the map when applied adjacent one marginal edge thereof. If desired, the device may be enlarged for application to large maps.

Wherever in the specification and/or claims I refer to the device of my invention in connection with maps, I wish it understood that I also intend to include applications of the device to plats, charts, etc., wherever coordinating marginal indicia are provided to which a geographical position may be related. The word "map" is used in the claims in the illustrative sense and not in the limiting sense.

Inasmuch as three sets of coacting indicia are involved in effecting a location with the device of my invention, I have endeavored to clarify the language of the claims by describing the map as having marginal indicia while the straight edge device has been described as having designations thereon and the slide carried by the straight edge device has been described as having an indicator thereon. In clarifying the several indicia in this way I have not intended to limit my invention, as either single or multiple indicia are intended by the terms "indicia," "designations" or "indicator," and it is intended that the claims shall be interpreted as setting forth indicia generally in all three portions of the map reading system.

While I have described the structure of my invention in certain of its preferred embodiments I realize that modifications in the construction and operation thereof may be made and I intend no limitations upon my invention other than may be imposed by the scope of the appended claim.

What I claim and desire to secure by Letters Patent of the United States is as follows:

A position locating device formed from plastic material, applicable to maps having latitude and longitude marginal indicia calibrated in terms of a coordinate chart carried by the map, comprising a pair of normally disposed straight edge portions, one of said straight edge portions having designations thereon alignable with indicia on one of the marginal edges of the map and the other of said straight edge portions enclosing a linear grooved slideway comprising a plastic plate frame-like member, a linear grooved slide-way, a slide substantially coplanar with said linear grooved slide-way and having a tongue projecting therefrom and extending into said linear grooved slide-way and detachably engageable and removable with respect to the linear grooved slide-way of said last mentioned straight edge portion, said linear grooved slide-way having a stop formed in the end thereof remote from said first mentioned straight edge portion and having an opening in the side edge thereof adjacent said stop through which said slide is engaged or removed from said slide-way, said slide being variably adjustable relative to the marginal indicia adjacent the opposite marginal edges of the map, and an indicator on said slide alignable with indicia on the other marginal edges of the map whereby said device may be shifted to various positions on the map and reversed in position with respect thereto for aligning the designations on said first mentioned straight edge portion and the indicator on said slide with the indicia on the marginal edges of the map according to the coordinates of the particular geographical location under observation and said slide adjusted to a position between limits comprising said stop and said first mentioned straight edge portion for approximately centering the geographical location under observation within the confines of the frame-like portion of said slide.

ELIZABETH C. HARRIS.

REFERENCES CITED

The following references are of record in the file of this patent:

UNITED STATES PATENTS

| Number | Name | Date |
|---|---|---|
| 805,216 | Lynch | Nov. 21, 1905 |
| 832,871 | Mitchell | Oct. 9, 1906 |
| 1,245,311 | Black | Nov. 6, 1917 |
| 1,276,657 | Ibanez | Aug. 20, 1918 |
| 1,389,293 | Bridewell | Aug. 30, 1921 |
| 1,710,555 | Tascarella | Apr. 23, 1929 |
| 1,993,589 | Borden | Mar. 5, 1935 |
| 2,242,735 | Widess | May 20, 1941 |
| 2,393,228 | Blitz | June 22, 1946 |
| 2,411,300 | Southwell | Nov. 19, 1946 |

FOREIGN PATENTS

| Number | Country | Date |
|---|---|---|
| 203,455 | Great Britain | 1923 |
| 747,434 | France | 1933 |